United States Patent [19]
Hendrickson et al.

[11] Patent Number: 5,933,455
[45] Date of Patent: Aug. 3, 1999

[54] DATA SLICER FOR DEMODULATED BINARY FSK SIGNALS IN A TIME DIVISION DUPLEX RADIO ENVIRONMENT

[75] Inventors: Alan F. Hendrickson; Peter Sheldon, both of Austin, Tex.

[73] Assignee: Advanced Micro Devices, Inc., Sunnyvale, Calif.

[21] Appl. No.: 08/864,651

[22] Filed: May 28, 1997

[51] Int. Cl.⁶ .................................................. H04L 23/02
[52] U.S. Cl. .......................... 375/261; 375/206; 341/122; 341/110; 327/77
[58] Field of Search ..................................... 375/206, 261; 341/122, 110; 330/279; 327/77; 455/293, 295, 306, 303, 307

[56] References Cited

U.S. PATENT DOCUMENTS

| | | | |
|---|---|---|---|
| 4,937,842 | 6/1990 | Howell | 375/98 |
| 5,365,120 | 11/1994 | Main | 327/77 |
| 5,436,589 | 7/1995 | La Rosa et al. | 329/302 |
| 5,801,867 | 9/1998 | Geller et al. | 359/189 |

*Primary Examiner*—Wellington Chin
*Assistant Examiner*—Isaak R. Jama

[57] ABSTRACT

Method and apparatus for providing a FSK data slicer for use in wireless telecommunications such as cordless telephones. The FSK data slicer is used by a receiver circuit in a wireless telecommunication device for converting an analog data signal to a digital data signal. Furthermore, the FSK data slicer responds to different mode of the analog data signal. The FSK data slicer includes a low-pass filter, a controller, a comparator, and an integrator. The low-pass filter receives the analog data signal for generating a median voltage, or slice voltage. Furthermore, the low-pass filter includes connectors to allow an external resistor to be serially connected between the filter input and the analog data signal and to allow an external capacitor to be connected in parallel with the slice voltage at the filter output. The bandwidth of the low-pass filter is controlled by the controller. The controller responds to specific intervals of the TDD frames, initial acquisition of data in the analog data signal, and known characteristics of the TDD frames and adjusts the low-pass filter bandwidth, accordingly. As a result, the low-pass filter drives the slice voltage only when it can do so accurately, and drives it strongly when the slice voltage will be very accurate. The comparator receives and compares the analog data signal and the slice voltage in order to produce a digital data signal. The digital data signal is then sent to the integrator, which over-samples each data bit of the digital data signal. The over-sampling is concentrated on the middle three quarters of each data bit, thereby ensuring the highest level of reliability.

23 Claims, 2 Drawing Sheets

DATA SLICER FOR DEMODULATED BINARY FSK SIGNALS IN A TIME DIVISION DUPLEX RADIO ENVIRONMENT

BACKGROUND OF THE INVENTION

1. Field of the Invention

The invention relates to data slicer circuits and, more particularly, to a method and apparatus for digitizing received demodulated binary frequency shift keyed (FSK) data in a time division duplex wireless telecommunication application, such as a cordless telephone.

2. Discussion of Related Technology

Data slicers are circuits used in many signal processing applications, including many different types of wireless or radio telecommunications. For example, cordless telephones, which include a first and second unit such as a handset and base, may utilize data slicers to interpret analog FSK radio signals passed back and forth between the two units. The two units communicate on a single frequency by allocating alternating time periods for transmission from each unit. Both units include a receiver circuit and a transmitter circuit for receiving and transmitting the FSK signals, respectively, and the data slicer is commonly used in the receiver circuit. In applications such as these, the data slicer serves to receive an analog data signal and convert it to a digital data signal, for use in processors and other digital circuits.

FIG. 1 describes a prior art, non-coherent binary FSK data slicer, designated generally by the reference numeral 10, as used by a receiver circuit 11 of a cordless telephone. The receiver circuit 11 operates to produce a digital baseband data signal RXD from an intermediate radio frequency signal IF. The intermediate frequency signal IF is received into a demodulator 12. The demodulator 12 appropriately demodulates the intermediate frequency IF to produce an analog baseband signal RXA, which is composed of a series of time division duplex (TDD) data frames. The analog baseband data signal RXA is fed into a non-inverting terminal ("+") of a comparator 14 and a threshold detector circuit 16.

The threshold detector circuit 16 produces a slice level VSL that represents a "middle" voltage level of the analog baseband data signal RXA. For the sake of simplicity, all voltage levels are to be measured with respect to a common ground voltage (not shown), unless stated otherwise. The slice level VSL is then fed into an inverting terminal ("−") of the comparator 14. The comparator 14 compares the analog baseband data signal RXA with the slice level VSL in order to drive the digital baseband data signal RXD.

Waveform 20 of FIG. 2 illustrates an ideal analog baseband data signal RXA waveform from the demodulator 12 for two TDD data frames 22 and 24. Each TDD data frame is divided into a transmission interval TX, during which the first unit transmits data to the second unit, and a reception interval RX, during which the first unit receives data from the second unit, each about one msec in duration. In this example, the analog baseband data signal RXA produces a sequence that is "valid", or data-rich, during the reception intervals RX, and is "invalid" or meaningless, during the transmission intervals TX. During the reception interval RX of the TDD data frames, excursions of the waveform below a middle voltage 26 represent a logic "0" bit, and those above the middle voltage represent a logic "1" bit.

One reason that the sequence of data in the baseband data signal RXA is invalid during the transmission intervals TX is that the FSK data slicer 10 is only used in the reception intervals RX. Therefore, since many cordless telephones utilize batteries, the demodulator 12 can be powered down during the transmission interval TX in order to save power. However, this step of powering down creates difficulties in determining the slice level VSL. For example, during the transmission interval TX, the voltage level of the analog baseband data signal RXA can drop and the slice level VSL will be adversely affected. As a result, when a sequence of data begins, such as at the beginning of a reception interval RX, a proper interpretation of the initial logic levels in the sequence is subject to errors due to the incorrect slice level VSL.

Additional difficulties result from the behavior of the intermediate frequency signal IF. As mentioned above, waveform 20 of FIG. 2 demonstrates an "ideal" waveform, wherein the vertical axis is a voltage relating directly to the instantaneous frequency of the intermediate frequency signal IF and the horizontal axis represents time. The ideal waveform 20 would be produced by an ideal receiver circuit in the first unit. However, most conventional cost effective transmitter circuits generate TDD data frames similar to those described in waveform 30. For example, a center voltage of the waveform "droops" in response to high-pass or band-pass characteristics of the receiver circuit processing the voltage waveform, as illustrated by reference arrow 34. In addition, an output center frequency of the waveform is also affected by an overall "balance" of the transmitted sequence. For example, if the sequence has a preponderance of either logic "1s" or logic "0s", the output center frequency from the transmitter in the second unit may be adversely affected by an undesirable response of a low-pass loop filter in a phase-locked loop used by the transmitter. Furthermore, the output center frequency may also change as a result of time-varying loading conditions on the transmitter circuit. For the remaining discussion, these effects will be collectively referred to as pulling. It is understood that the cause and effects of pulling are well known by those of ordinary skill in the art.

Another source of distortion in the TDD data frames is the demodulator 12. The output voltage of the analog baseband data signal RXA is different from one demodulator to the next, due to different factors in manufacturability. In particular, the demodulator 12 has a component commonly referred to as a demodulator quadrature element (not shown). Frequency changes in the analog baseband data signal RXA are influenced by a quality factor of the demodulator quadrature element, and a voltage offset of the analog baseband data signal RXA may be shifted due to demodulator variability. As a result, the demodulator 12 brings a degree of unpredictability to the analog baseband data signal RXA depending from one demodulator to the next. For the remaining discussion, the effects of the variability in the demodulator 12 will be collectively referred to as demodulator distortion. It is understood that the cause and effects of demodulator distortion are well known by those of ordinary skill in the art.

Due to the unique operation of the analog baseband data signal RXA, including the "invalid" data during the transmission interval TX, the effects of pulling, and the effects of demodulator distortion, the generation of the slicing level VSL is difficult for the threshold detector 16. Conventionally, the threshold detector 16 determines the slicing level VSL by calculating the direct current (DC) level, i.e., the long term average of the analog baseband data signal RXA, by simply using a conventional low-pass filter. However, while this solution may seem appropriate for a continuous data stream, a low-pass filter alone is insufficient for TDD data frames. When using TDD data frames, the slicing level VSL will be adversely affected by the voltage level of the analog baseband data signal RXA during the transmission intervals TX. In addition, the pulling and demodulator distortion can offset the analog baseband data signal RXA so that the slice level VSL is incorrect for certain instances of each TDD data frame. Therefore, what is needed is a FSK data slicer that produces a relatively accurate slice voltage level in a TDD environment.

Another difficulty associated with the conventional FSK data slicer 10 in the TDD environment is the operation of the comparator 14. The analog baseband data signal RXA provides each logic level associated with a bit of information over a discrete interval of time before transitioning to the bit. However, the accuracy associated with a bit is relatively low near the bit interval boundaries, i.e., the time periods marking the beginning and the end of a bit interval. As a result, comparisons performed over the entire interval becomes error-prone due to the presence of noise at bit interval boundaries. Alternatively, a comparison that is performed once during a single bit interval is also error-prone because it is not evaluating all of the energy during the entire bit interval. Therefore, what is needed is a FSK data slicer that is tolerant of comparator errors at bit interval boundaries, and that evaluates the symbol energy across the entire bit interval period.

Furthermore, what is needed is a relatively small FSK data slicer that requires only a few pins of a single integrated circuit, is relatively inexpensive to manufacture, and tolerates inconsistencies of manufacturing.

SUMMARY OF THE INVENTION

The foregoing problems are solved and a technical advance is achieved by a method and apparatus for providing a FSK data slicer for use in wireless telecommunications such as cordless telephones. The FSK data slicer is used by a receiver circuit in a wireless telecommunication device for converting an analog data signal to a digital data signal. Furthermore, the FSK data slicer is responsive to characteristics of the TDD environment.

The FSK data slicer includes a low-pass filter, a controller, a comparator, and an integrator. The low-pass filter receives the analog data signal in order to generate a median voltage, or slice level. In one embodiment, the low-pass filter has a variable bandwidth and includes connectors to allow an external resistor to be serially connected between the filter input and the analog data signal and to allow an external capacitor to be connected in parallel with the slice level at the filter output. The bandwidth of the low-pass filter is controlled by the controller. The controller adjusts the low-pass filter bandwidth in response to reception/transmission intervals, times when a sequence of data begins, and certain characteristics of the transmitted sequence. As a result, the low-pass filter drives the slice level only when it can do so accurately, and drives it strongly when the slice level will be very accurate.

The comparator receives and compares both the analog data signal and the slice level to produce a binary digital data signal. The binary digital data signal is then sent to the integrator, which over-samples each data bit interval of the digital data signal, approximating an integrate and dump function, by effectively multiplying the input signal by a time window reflecting the approximate energy distribution of the signal within the bit interval.

DETAILED DESCRIPTION OF THE PREFERRED EMBODIMENTS

Figure 1:
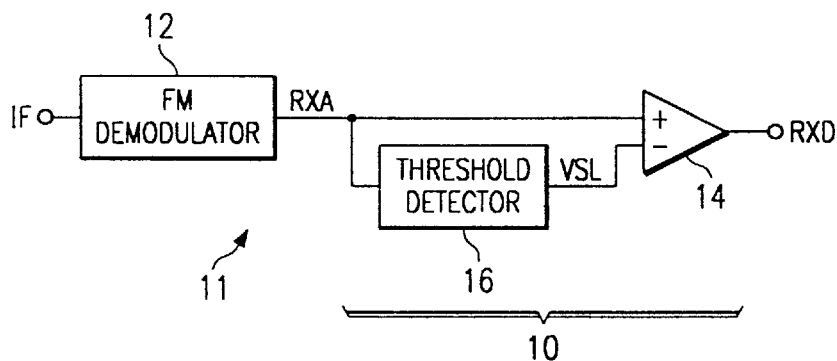
FIG. 1 is a block diagram of a prior art conventional FSK data slicer.
Figure 2:
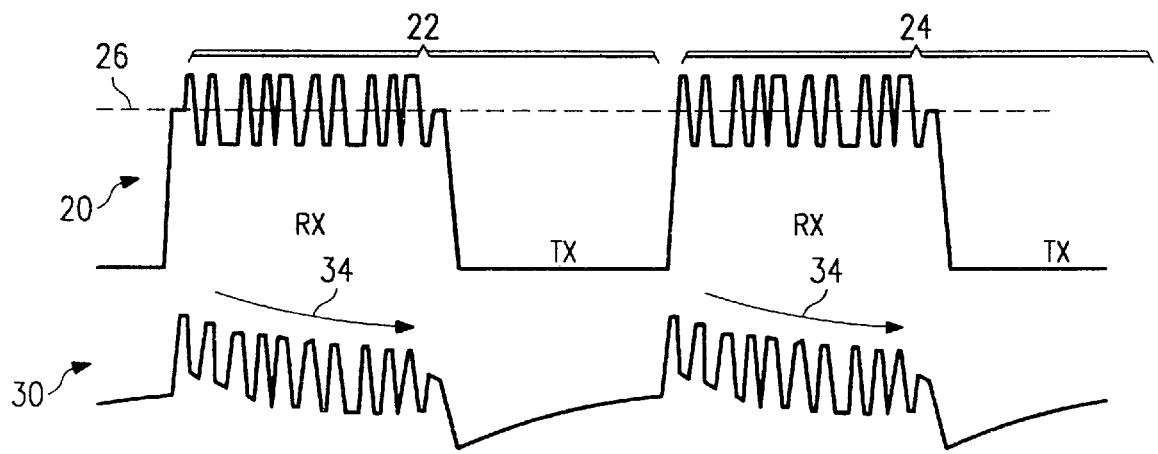
FIG. 2 illustrates an ideal waveform and an actual waveform for two TDD data frames.

As discussed above, FIG. 1 describes a prior art frequency shift keyed (FSK) data slicer and FIG. 2 describes waveforms for ideal TDD data frames and conventional TDD data frames.

Figure 3:
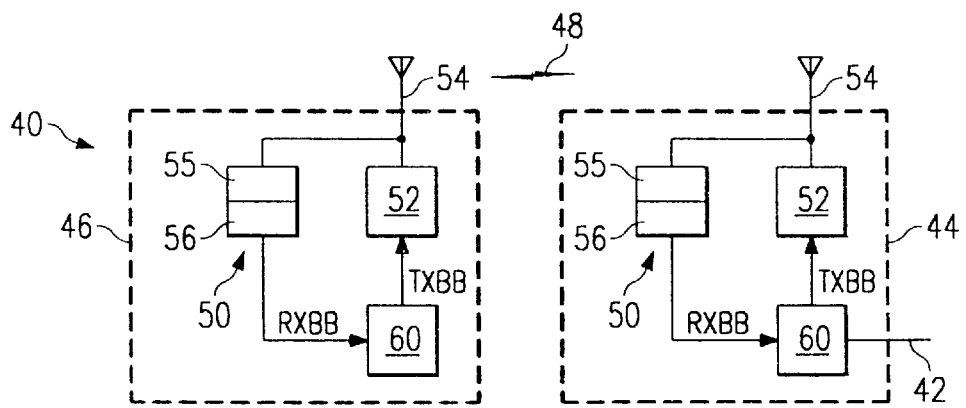
FIG. 3 is a block diagram of a hand unit and base unit of a cordless telephone utilizing the FSK data slicer of the present invention.

Referring to FIG. 3, the reference numeral 40 generally designates a single cordless telephone connected to a conventional telephone line 42. The cordless telephone 40 includes a base set unit 44 and a hand set unit 46. The base set unit 44 and hand set unit 46 communicate by radio frequency (RF), represented by arrow 48. The RF communication 48 utilizes one or more sequences of FSK modulated data.

Each unit 44, 46 of the cordless telephone 40 includes a receiver circuit 50 and a transmitter circuit 52. The receiver circuit 50 receives the RF communication 48 through an antenna 54. The receiver circuit 50 includes a demodulator 55 that demodulates the FSK data into an analog baseband data signal RXA (not shown), and a FSK data slicer 56, which detects digital bits in the demodulated analog baseband data signal RXA and presents them serially as a digital baseband data signal RXBB for use by a controller 60. The transmitter circuit 52 receives a digital baseband data transmit signal TXBB from the controller 60, modulates it, and drives the modulated signal through the antenna 54.

The TDD frame timing is determined by the transmitter circuit 52 of the units 44, 46. Since the transmitter circuit 52 is not the subject of the present invention, the TDD data frames are assumed to behave as described by waveform 30 (FIG. 2), wherein the TDD data frames are divided into a reception interval RX and a transmission interval TX, and are potentially subject to pulling and demodulator distortion. The reception intervals RX and transmission intervals TX are coordinated so that the transmission interval of the hand set unit 46 coincides with the reception interval of the base unit 44, and the reception interval of the hand set unit 46 coincides with the transmission interval of the base unit 44.

Figure 4:
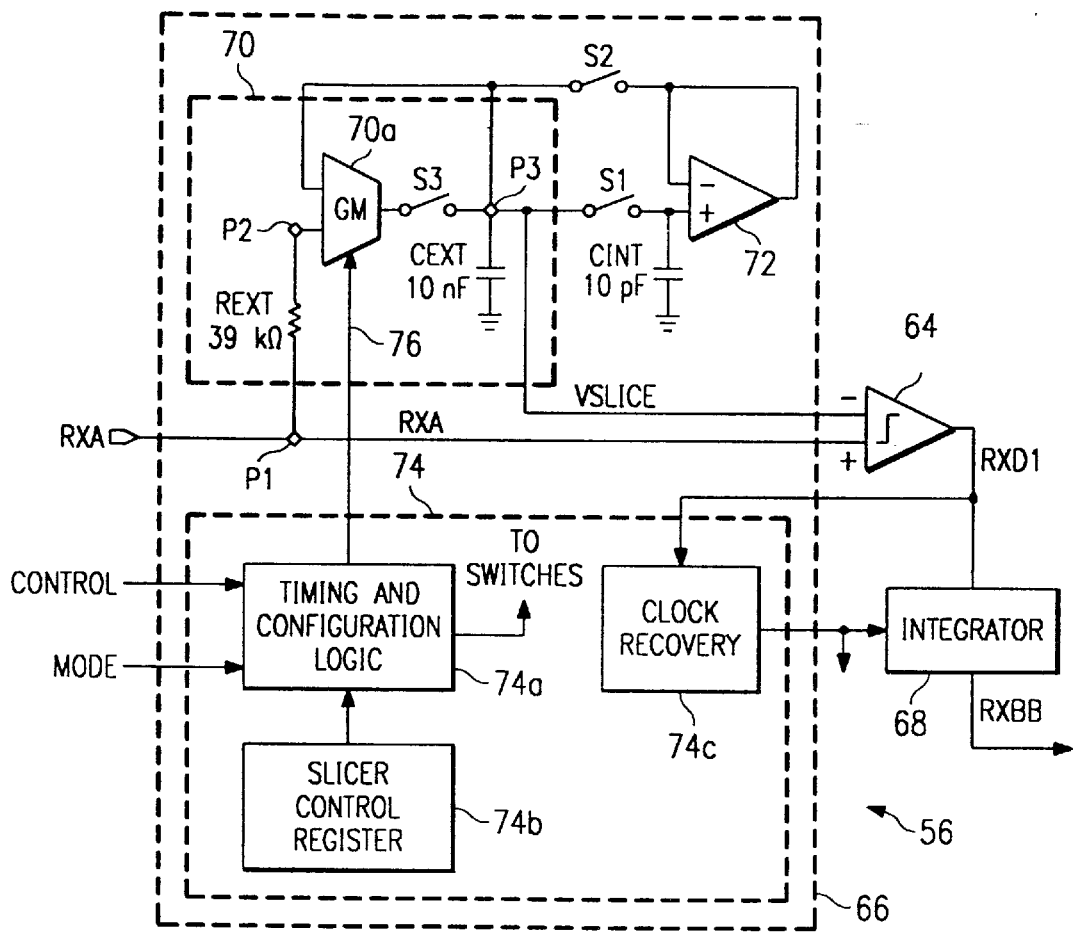
FIG. 4 is a block diagram of a FSK data slicer used in one of the units of FIG. 3 according to the present invention.

Referring to FIG. 4, the FSK data slicer 56 receives the analog baseband data signal RXA and drives the signal into a non-inverting terminal ("+") of a comparator 64. The analog baseband data signal RXA is also supplied to an improved threshold detector circuit 66, which in turn produces a slice level VSLICE. The comparator 64 is similar to the comparator 14 of FIG. 1 in that it compares the analog baseband data signal RXA with the slice level VSLICE, received into the inverting terminal ("−") of the comparator, to produce a recovered binary data stream RXD1. However, the slice level VSLICE of FIG. 4 more accurately tracks a midpoint of the analog baseband data signal RXA than the slice level VSL of FIG. 1, as will be described in detail below. Furthermore, the recovered binary data stream RXD1 is further evaluated by an integrator 68 to produce the baseband data signal RXBB. As a result, the sliced baseband data signal RXBB is more reliably produced, as compared to the conventional digital baseband data signal RXD of FIG. 1.

The threshold detector circuit 66 includes a low-pass filter 70, a sample/hold circuit 72, an internal capacitor CINT and a controller 74. Connected between the low-pass filter 70 and the sample/hold circuit 72 are switches S1, S2, and S3, implemented as complimentary metal oxide semiconductor (CMOS) pass gates. The low-pass filter 70 receives the analog baseband signal RXA to drive the slice level VSLICE. The sample/hold circuit 72 retains the slice level VSLICE acquired during the reception interval RX throughout the following transmission interval TX. The controller 74 provides a means to vary the bandwidth of the low-pass filter 70 and to time the operation of the switches S1, S2, and S3. Furthermore, the preferred embodiment of the threshold detector circuit 66 is contained on a single integrated circuit, with external pins P1, P2, and P3 which allow user modification of the low-pass filter 70, as described in greater detail, below.

The low-pass filter 70 effectively rejects the data-dependent voltage variation in the demodulator output while passing the slowly varying voltage changes attributable to pulling, thereby determining a midpoint voltage of the analog baseband data signal RXA. The low-pass filter 70 includes a voltage-to-current amplifier 70a with a variable transconductance gain "GM" and external passive components. The external passive components, including a resistor REXT and capacitor CEXT, are connected through external pins P1, P2, and P3. The resistor REXT is connected in series between the output of the demodulator 62 at an external pin P1 and the input of the amplifier 70a at an external pin P2. The capacitor CEXT is connected between the output of the amplifier 70a at an external pin P3 and ground. The external passive components REXT, CEXT allow a user to vary the low-pass filter's cut-off frequency and tolerance according to the user's specifications. The external passive components, along with the transconductance gain GM, determines a 3-dB cut-off frequency according to the equation:

$$\text{Cut-off Frequency} = \frac{1}{2\pi} GM \frac{1}{CEXT * REXT}.$$

As a result, the controller adjusts the cut-off frequency of the low-pass filter 70 by changing the transconductance gain GM.

In the preferred embodiment, REXT=39 kOhms and CEXT=10 nF. Therefore, with effective values of the transconductance gain GM equal to 1, 2, or 10, the low-pass filter 70 may selectively provide cut-off frequencies of 408, 816, or 4080 Hz. Additionally, the low-pass filter 70 can be disabled entirely (GM=0.0).

The transconductance gain GM of the amplifier 70a, and hence the bandwidth of the low-pass filter 70, is determined by the controller 74. The controller 74 includes a timing and configuration logic block 74a, a control register 74b, and a clock recovery circuit 74c. The timing and configuration logic block 74a receives several signals including a CONTROL signal and a MODE signal. The CONTROL signal indicates certain characteristics about the analog data signal RXA and the MODE signal indicates an operating mode of the analog data signal. It is anticipated, however, that certain embodiments of the timing and configuration logic block 74a may only have one of the two signals, or may receive a different signal from which the characteristics and operating modes related to the analog data signal RXA can be deduced. The timing and configuration logic block 74a also receives control data from the control register 74b. The control data directs the timing and configuration logic block 74a to drive a predetermined transconductance gain GM or to configure the switches S1, S2, and S3, according to the specific operating modes and characteristics related to the analog data signal RXA.

One such operating mode is an acquisition mode. Acquisition mode is a period of time during the reception interval RX when a sequence of FSK data in the analog data signal RXA is initially expected. For example, when the base unit 44 initiates a communication with the handset unit 46, the handset unit is in acquisition mode to detect the communication. Because a significant period of time may have elapsed since the last communication, the slice level VSLICE may be inaccurate. Therefore, the transconductance gain GM for the amplifier 70a should be high to allow the slice level to quickly adjust.

Another operating mode is a sample/hold mode. Sample/hold mode corresponds directly with whether the analog data signal RXA is in the reception interval RX or transmission interval TX, respectively. During the reception interval RX, the transconductance gain GM for the amplifier 70a should be responsive to the analog data signal RXA to adjust the slice level VSLICE accordingly. Therefore, the switches S1 and S3 are closed and the switch S2 is open. During the transmission interval TX, however, the low-pass filter 70 should ignore the analog data signal RXA. Therefore, the transconductance gain GM for the amplifier 70a is shut off (GM=0), the switch S2 is closed and switches S1 and S3 are open, thereby isolating the low-pass filter 70 from the slice level VSLICE. As a result, the configuration of the switches S1, S2, and S3 allow an internal capacitor CINT, along with the sample/hold circuit 72, to maintain the voltage level on the external capacitor CEXT at the slice level VSLICE.

Once a sequence of FSK data has begun, the controller 74 is responsive to known characteristics of the analog data signal RXA. Since the analog data signal RXA is comprised of TDD frames, it is known or can be readily determined which frames are strictly balanced, i.e., there is an equal number of logic "1's" or logic "0's" over a given interval, which are balanced statistically, and which are not balanced at all. Therefore, during the unbalanced frames, the controller 74 should only make limited adjustment to the slice level VSLICE, thereby requiring a low transconductance gain GM for the amplifier 70a. During the statistically balanced frames, the controller 74 should make moderate adjustment to the slice level VSLICE, thereby requiring a moderate transconductance gain GM for the amplifier 70a. During the strictly balanced sequences, the controller 74 should make significant adjustment to the slice level VSLICE, thereby requiring a significantly high transconductance gain GM for the amplifier 70a.

In addition to the improvements made in the threshold detector 66, the present invention also improves the FSK data slicer 56 by providing the integrator 68. The clock recovery circuit 74c of the controller 74 determines the frequency of the recovered binary data stream RXD1, which is used by the integrator 68. It is understood that clock recovery circuits are well understood by those of ordinary skill in the art and, for the sake of brevity, will not be further discussed.

The integrator 68 is a simple integrate-and-dump circuit. However, the present invention provides an integration range for the integrator 68 that enhances the accuracy of the digital baseband signal RXBB. The integrator 68 receives an output from the clock recovery circuit 74c so that the integrator is synchronized as to when each bit interval of the recovered binary data stream RXD1 begins and ends. In the preferred embodiment, the integrator 68 over-samples each bit interval of the recovered binary data stream RXD1 16 times. However, only the central three quarters (i.e., 12 samples) during each bit interval are integrated to determine whether the bit information was a digital "1" or a "0".

Figure 5:
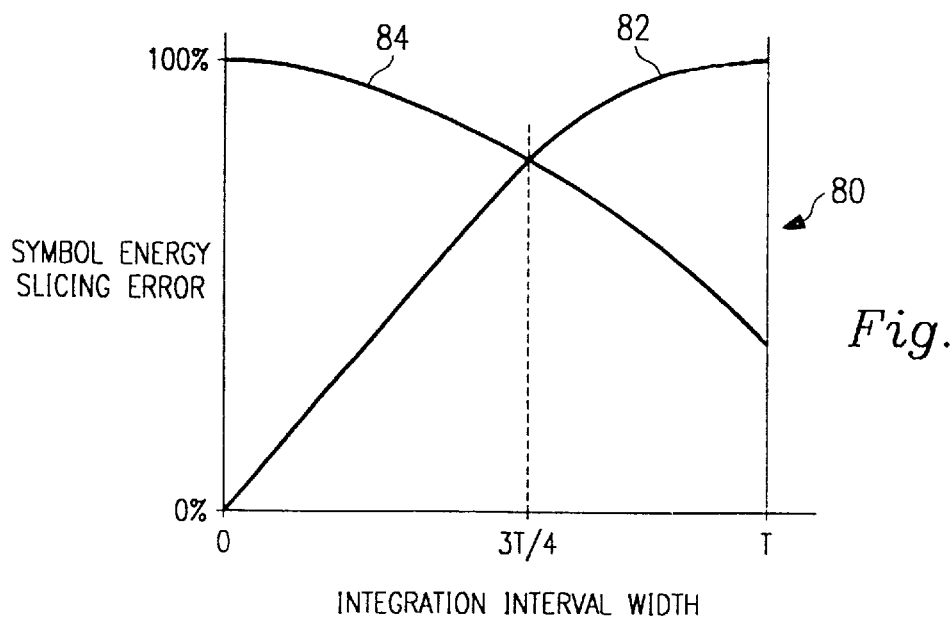
FIG. 5 is a graphical representation of observed energy and slice level offset for a single data pulse of a TDD data frame.

Referring to FIG. 5, the reference numeral 80 represents a graph of two independently normalized performance metrics as a function of the width of an integration interval centered at the midpoint of a single received bit of the recovered data stream RXD1. The horizontal axis represents the integration interval width variable. An energy observed curve 80 represents the amount of available bit energy that is included in the integration interval. For example, if the integration period covers an entire bit period (−T to T), 100% of the available bit energy is included in the calculation. On the other hand, if a single sample of the bit interval is taken at the middle of the bit interval period (0), a disproportionately low amount of the available energy is included in the calculation. The shape of the energy observed curve 82 is determined by the pulse shape of the received bit and the shape shown in FIG. 5 is representative only. The energy observed curve 82 can be calculated from the pulse shape of the received bit by integrating the square of the pulse shape over an interval symmetrically centered on the midpoint of the bit pulse shape and varying the width of the integration interval from 0 to T. In terms of a correlator implementation of a matched filter, the integration interval represents a binary-weighted approximation of the pulse shape. Assuming a perfectly centered slicing level (e.g., middle voltage 26 of FIG. 2) and a rectangular pulse shape over the entire bit interval period, the error performance of the receiver would be expected to improve as the amount of integration interval is increased.

A tolerable slice level offset error curve 84 demonstrates the trend of degradation in the integration calculation as a result of offset error in the slice level VSLICE (FIG. 4) with respect to a true horizontal centerline of the bit interval sequence. For example, placement of the slice level VSLICE above the true horizontal centerline results in an overall decrease in the integral of the difference between a given received bit and the slice level. Since this integral is the basis for comparison operation by the comparator 64, the slice level offset error tends to bias the decision, degrading the performance of the comparator. Increasing the length of the integration interval increases the bias for a given slice level offset error. Conversely, the amount of offset required to produce an error decreases as the integration interval increases. It can be seen then from the representative tolerable slice level offset error curve 84, that more offset error can be tolerated if the integration period is short.

The contrasting slopes of the curves 82, 84 in FIG. 5 demonstrate that the error performance of the slicer, which improves with observed energy and with tolerated offset error, can be optimized for a given system by choosing an appropriate integration interval. It becomes apparent that for an integration interval width greater than about 3T/4, little improvement is gained in the observed energy curve 82 while the offset tolerance decreases significantly between 3T/4 and T. In the preferred embodiment, the integration interval width is set to 3T/4, due to the shape of the received bit pulses and the convenience of implementation with digital counters.

It is understood that the present invention is not limited to cordless telephones, but may be used with modems, computer networks, and many other different types of electronic circuits. Therefore, although certain illustrative embodiments of the invention have been shown and described, a wide range of modification, change, and substitution is contemplated in the foregoing disclosure and, in some instances, some features of the present invention may be employed without a corresponding use of other features. Accordingly, it is appropriate that the foregoing description be construed broadly and understood as being given by way of illustration and example only, the spirit and scope of the invention being limited only by the appended claims and structural equivalents thereof.

What is claimed is:

1. A circuit for converting an analog data signal to a first digital data signal, the circuit comprising:

a comparator having a first input terminal for receiving an analog data signal, a second input terminal for receiving a slice voltage, and an output terminal for driving a first digital data signal;

a low-pass filter, wherein said filter drives said slice voltage, wherein said low-pass filter comprises: a variable transconductance amplifier including a first input terminal being adapted to connect to an external resistor serially connected between said amplifier first input terminal and said analog data signal; an output terminal being adapted to connect to an external capacitor connected in parallel with said slice voltage; and a control terminal for receiving control signals to adjust a gain of said amplifier.

2. The circuit of claim 1, further comprising a first switch connected between said amplifier output terminal and said external capacitor for isolating said slice voltage from said amplifier output terminal.

3. The circuit of claim 1 wherein said amplifier further includes a second input terminal for receiving said slice voltage.

4. The circuit of claim 2 further comprising an internal capacitor such that when said first switch is in a first state, said internal capacitor is charged by said amplifier, and when said first switch is in a second state, said internal capacitor maintains said slice voltage.

5. The circuit of claim 4, further comprising a sample/hold circuit having an output and having an input connected to said internal capacitor and having a second switch disposed between an output of said sample/hold circuit output and said slice voltage, wherein when said second switch is in a first state said sample/hold circuit output maintains said slice voltage and when said second switch is in a second state said sample/hold circuit output is isolated from said slice voltage.

6. The circuit of claim 1, further comprising an integrator for producing a second digital data signal from said first digital data signal, the integrator being an integrate-and-dump type circuit, wherein the integrator over-samples each data bit interval of the first digital data signal and integrates a predetermined portion of those samples to produce said second digital signal.

7. The circuit of claim 6, wherein said predetermined portion of samples represents a middle three-fourths of total samples from each data bit interval.

8. The circuit of claim 1, further comprising a controller for driving said control signals to adjust said amplifier gain, wherein said analog data signal comprises time division duplex ("TDD") frames, and wherein said control signals are responsive to specific intervals of said TDD frames.

9. The circuit of claim 1, further comprising a controller for driving said control signals to adjust said amplifier gain, wherein said control signals are responsive to initial acquisition of data in said analog data signal.

10. The circuit of claim 1, further comprising a controller for driving said control signals to adjust said amplifier gain, wherein said analog data signal comprises time division duplex ("TDD") frames, and wherein said control signals are responsive to known characteristics of said TDD frames.

11. The circuit of claim 5, further comprising a controller for driving said control signals to control the states of said first and said second switches and to adjust said amplifier gain, wherein said analog data signal comprises time division duplex ("TDD") frames, and wherein said control signals are responsive to specific intervals of said TDD frames, to initial acquisition of data in said analog data signal, and to known characteristics of said TDD frames.

12. A method of data slicing an analog data signal to form a first digital data signal, comprising the steps of:

receiving an analog signal into a variable bandwidth low-pass filter to produce a slicing voltage for said analog signal, wherein said analog signal includes bit intervals;

selectively adjusting said bandwidth of said variable bandwidth low-pass filter in response to predetermined intervals of said analog signal; and receiving and comparing said analog signal and said slicing voltage to first form a digital data signal having digital data bits.

13. The method of claim 12, further comprising the steps of:

providing a voltage storage device for storing said slicing voltage, wherein said storage device continuously provides said slicing voltage for said step of receiving and comparing;

selectively driving said storage device with said variable bandwidth low-pass filter in response to said predetermined intervals of said analog signal; and Providing external pins on said variable bandwidth low-pass filter to allow an external resistor or an external capacitor to be connected to said low-pass filter.

14. The method of claim 12, further comprising the step of:

sampling said slicing voltage during said predetermined intervals of said analog signal and holding said slicing voltage constant during other said intervals of said analog signal using an internal capacitor and a sample/hold circuit.

15. The method of claim 12, further comprising the step of:

integrating each bit of said first digital data signal to form a second digital data signal, and wherein said step of integrating includes multiply sampling each said bit interval and integrating only a predetermined portion of the samples from each said bit interval.

16. The method of claim 15, wherein said predetermined portion of samples represents a middle three-fourths of total samples from each said bit interval.

17. The method of claim 12, wherein said analog data signal comprises time division duplex ("TDD") frames, and wherein said method further comprises the step of:

adjusting said low-pass filter bandwidth in response to prespecified intervals of said TDD frames.

18. The method of claim 12, wherein said analog data signal comprises time division duplex ("TDD") frames, and wherein said method further comprises the step of:

adjusting said the low-pass filter bandwidth in response to known characteristics of said TDD frames.

19. The method of claim 12, further comprising the step of:

adjusting said low-pass filter in response to an initial acquisition of bit intervals of said analog data signal.

20. The method of claim 12, wherein said analog data signal comprises time division duplex ("TDD") frames, and wherein said method further comprises the step of:

adjusting low-pass filter bandwidth in response to prespecified intervals of said TDD frames, to initial acquisition of bit intervals of said analog data signal, and to known characteristics of said TDD frames.

21. The method of claim 20, wherein said low-pass filter operates at a selected one of a plurality of bandwidths.

22. A circuit for converting an input analog data signal to an output digital data signal, comprising:

a comparator having a first input terminal for receiving an input analog data signal, a second input terminal for receiving a slice voltage, and an output terminal for driving a first digital data signal having bits;

a variable bandwidth low-pass filter for driving said slice voltage; and an integrator for producing an output digital data signal from said intermediate digital data signal, said integrator being an integrate-and-dump type circuit, wherein said integrator over-samples each digital data bit of said first digital data signal and integrates a predetermined portion of those samples to produce an output digital signal.

23. A data slicer of the type for converting an analog frequency shift keyed baseband data signal having time division duplex ("TDD") frames to a digital baseband data signal, comprising:

a comparator having a first input terminal for receiving an analog data signal, a second input terminal for receiving a slice voltage, and an output terminal for driving a first digital data signal having bits;

a low-pass filter for driving said slice voltage, wherein said low-pass filter comprises a variable transconductance gain amplifier which includes: a first input terminal to allow an external resistor to be serially connected between an input of said amplifier and said analog data signal, a second input terminal for receiving said slice voltage, an output terminal to allow an external capacitor to be connected in parallel with said slice voltage, and a control terminal for receiving control signals to adjust against said amplifier;

a first switch connected between said amplifier output terminal and said slice voltage, wherein said first switch isolates said amplifier from said slice voltage;

a sample/hold circuit having an output and an internal capacitor, wherein when said first switch is in a first position, said internal capacitor is charged by said amplifier, and when said first switch is in a second position, said internal capacitor maintains said slice voltage;

a second switch connected between said sample/hold circuit output and said slice voltage, wherein when said second switch is in a first position, said sample/hold circuit output maintains said slice voltage, and when said second switch is in a second position, said sample/hold circuit output is isolated from said slice voltage;

an integrator which produces a digital baseband data signal from said first digital data signal, said integrator being an integrate-and-dump type circuit, and wherein said integrator over-samples each bit of said first digital data signal and integrates a middle three-fourths of those samples to produce said digital baseband signal; and a controller which drive said control signals to adjust said amplifier gain, wherein said control signals are responsive to prespecified intervals of said TDD frames to, initial acquisition of data in said analog data signal, and to known characteristics of said TDD frames;

wherein said comparator, said low-pass filter, said sample/hold circuit, said internal capacitor, said first and said second switch, and said integrator all reside on a single integrated circuit device; and wherein said external resistor and said capacitor are connected through external pins of said integrated circuit device, thereby allowing said variable bandwidths to be externally controlled.

* * * * *